(12) United States Patent
Lee et al.

(10) Patent No.: US 7,309,149 B2
(45) Date of Patent: Dec. 18, 2007

(54) PRISM SHEET, BACKLIGHT ASSEMBLY AND LIQUID CRYSTAL DISPLAY DEVICE HAVING THE SAME

(75) Inventors: Jeong-Hwan Lee, Suwon-si (KR); Jin-Mi Jung, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 119 days.

(21) Appl. No.: 11/189,737

(22) Filed: Jul. 27, 2005

(65) Prior Publication Data

US 2006/0050534 A1 Mar. 9, 2006

(30) Foreign Application Priority Data

Sep. 9, 2004 (JP) ............... 10-2004-0072301

(51) Int. Cl.
*F21V 5/00* (2006.01)
*F21V 5/02* (2006.01)
*F21V 7/04* (2006.01)
*G02B 27/10* (2006.01)
*G02B 3/08* (2006.01)
*G02B 5/04* (2006.01)

(52) U.S. Cl. ............... 362/339; 362/606; 362/607; 362/620; 362/623; 362/624; 362/625; 362/627; 362/339; 359/833; 359/834; 359/625; 359/626; 359/627; 359/628; 359/742; 359/743

(58) Field of Classification Search ............... 362/606, 362/607, 620, 330, 339, 29, 31, 623–627; 349/57, 62; 359/833, 834, 625–628, 742–743
See application file for complete search history.

(56) References Cited

U.S. PATENT DOCUMENTS

| | | | | |
|---|---|---|---|---|
| 5,408,344 | A | * | 4/1995 | Takiguchi et al. ............ 349/57 |
| 6,075,649 | A | * | 6/2000 | Naito ........................ 359/619 |
| 6,876,408 | B2 | * | 4/2005 | Yamaguchi .................. 349/57 |
| 6,897,911 | B2 | * | 5/2005 | Yamaguchi .................. 349/57 |

* cited by examiner

*Primary Examiner*—Sandra O'Shea
*Assistant Examiner*—Sean P. Gramling
(74) *Attorney, Agent, or Firm*—MacPherson Kwok Chen & Heid LLP

(57) ABSTRACT

A prism sheet, a backlight assembly having the prism sheet, and an LCD device having the prism sheet, the prism sheet includes a first surface, a second surface and a reflecting member. A light is incident upon the first surface. The second surface includes a prism pattern. The incident light exits through the second surface. The reflecting member is provided on the first surface to partially reflect irradiated light that is received on the first surface.

24 Claims, 5 Drawing Sheets

PRISM SHEET, BACKLIGHT ASSEMBLY AND LIQUID CRYSTAL DISPLAY DEVICE HAVING THE SAME

CROSS-REFERENCE TO RELATED APPLICATION

The present application claims priority to and benefit of Korean Patent Application No. 200-72301, filed on Sep. 9, 2004, which is hereby incorporated by reference for all purposes as if fully set forth herein.

BACKGROUND OF THE INVENTION

1. Field of the Invention

The present invention relates to a prism sheet, a backlight assembly having the prism sheet and a liquid crystal display (LCD) device having the prism sheet. More particularly, the present invention relates to a prism sheet capable of improving luminance, a backlight assembly having the prism sheet and an LCD device having the prism sheet.

2. Description of the Related Art

An LCD device displays an image using a liquid crystal. The LCD apparatus is advantageous over other display apparatuses, such as a cathode ray tube (CRT), a plasma display panel (PDP) device, etc., because it is thin, has a lower driving voltage, and consumes less power than other display apparatus.

The LCD device includes a thin film transistor (TFT) substrate, a color filter substrate that corresponds with the TFT substrate, and a liquid crystal layer interposed between the TFT substrate and the color filter substrate. An arrangement of the liquid crystal layer varies in response to an electric field applied thereto and displays an image. The LCD device is a non-emissive type display device that does not generate its own light source, therefore, the LCD device requires a backlight assembly.

The backlight assembly includes a lamp, a light guiding plate, a reflecting sheet, a prism sheet, and a receiving container. The lamp generates a light. The light guiding plate guides the light generated from the lamp into an LCD panel. The reflecting sheet is positioned under the lamp. The light generated from the lamp reflects from the reflecting sheet toward the LCD panel. Luminance, when viewed in front of the LCD panel, is increased due to the prism sheet. The receiving container receives the lamp, the light guiding plate, the reflecting sheet and the prism sheet.

However, the conventional LCD, as described above, has a low luminance.

SUMMARY OF THE INVENTION

The present invention provides a prism sheet capable of improving luminance.

Additional features of the invention will be set forth in the description which follows, and in part will be apparent from the description, or may be learned by practice of the invention.

The present invention discloses prism sheet, including a first surface upon which a is light is incident, a second surface upon which the incident light exits, the second surface having a prism pattern, and a reflecting member provided on the first surface that partially reflects irradiated light that is received on the first surface.

The present invention also discloses a prism sheet including a film having a first surface upon which a light is incident and a second surface through which the incident light exits, a light path modulation member on the second surface that guides the incident light toward a front of the prism sheet, and a reflecting member provided on the first surface that partially reflects irradiated light that is received on the first surface.

The present invention also discloses a backlight assembly including a light source that generates a light, and a prism sheet including a first surface upon which the generated light is incident, a second surface upon which the incident light exits, the second surface comprising a prism pattern having a plurality of prisms, and a reflecting member provided on the first surface that partially reflects irradiated light that is received on the first surface.

The present invention also discloses a backlight assembly including a light source that generates a light, a prism sheet including a first surface upon which the generated light is incident, a second surface upon which the incident light exits, the second surface comprising a prism pattern having a plurality of prisms, and a reflecting member provided on the first surface that partially reflects irradiated light that is received on the first surface.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DESCRIPTION OF THE ILLUSTRATED EMBODIMENTS

It is understood that the embodiments of the invention described below may be modified in many different ways without departing from the inventive principles disclosed herein, and the scope of the invention is not limited to the following embodiments. Rather, the embodiments are provided so that this disclosure will fully convey the concept of the invention to those skilled in the art by way of example and not of limitation.

Hereinafter, the invention is described with reference to the accompanying drawings.

Figure 1:
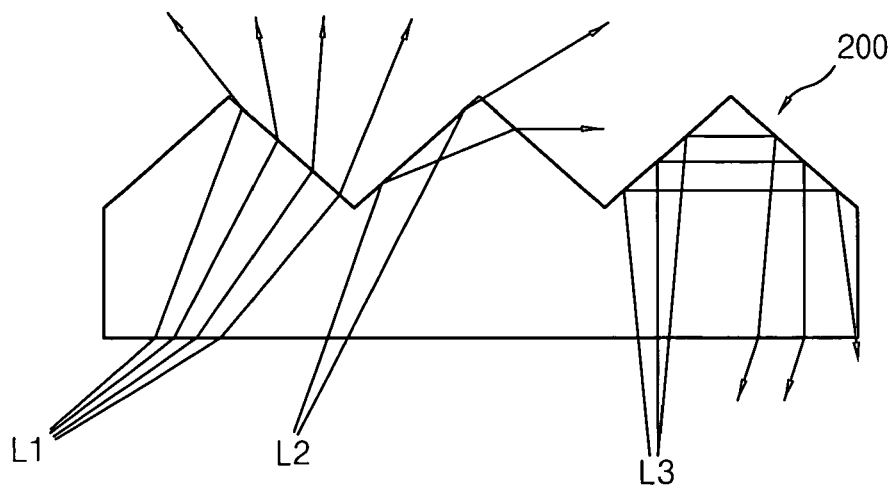
FIG. 1 is a cross-sectional view showing a light passing through a prism sheet without a reflecting member.

FIG. 1 is a cross-sectional view showing a light that passes through a prism sheet without a reflecting member.

Referring to FIG. 1, a first light L1, a second light L2, and a third light L3 are incident upon a lower surface of the prism sheet 200, and only the first and second lights L1 and L2 are refracted. The first light L1 is refracted toward a front of the prism sheet 200. The second light L2 is refracted toward a side of the prism sheet 200. The third light L3 is reflected from prism patterns of the prism sheet 200. The reflected third light L3 is reflected from a reflecting sheet (not shown) that is under the prism sheet 200 so that a portion of the third light L3 is recycled. It is understood that the refraction for the first light L1 and the second light L2, and reflection of the third light L3 are not limited to the directions discussed above and shown in FIG. 1.

Figure 2:
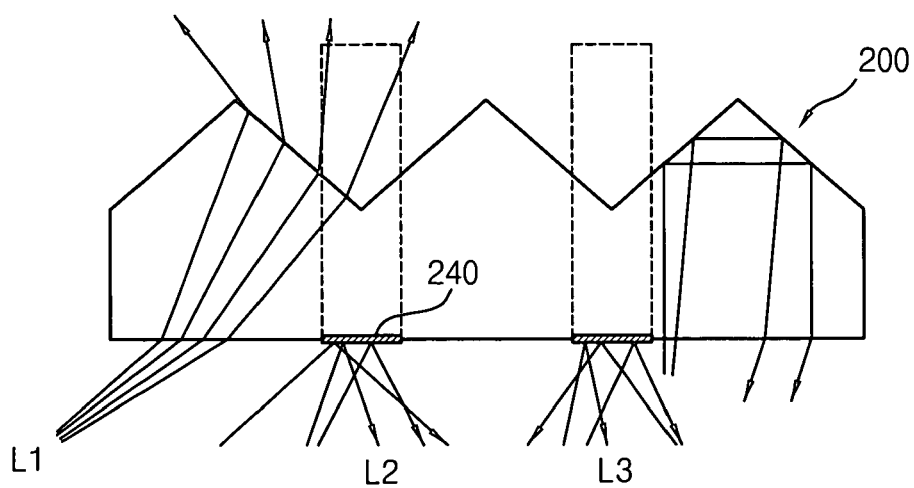
FIG. 2 is a cross-sectional view showing a light passing through a prism sheet according to an embodiment of the invention.

FIG. 2 is a cross-sectional view showing a light that passes through a prism sheet according to an embodiment of the invention.

Referring to FIG. 2, a first light L1, a second light L2 and a third light L3 are incident upon a lower surface of the prism sheet 200. The first light L1 is refracted toward a front of the prism sheet 200. The prism sheet 200 may include a reflecting member 240 on a lower surface of the prism sheet 200. For example, as shown in FIG. 2 the prism sheet 200 may include a plurality of reflecting members 240. In the embodiment shown in FIG. 2, the second light L2 reflects from the reflecting member 240, and the third light L3 reflects from prism patterns of the prism sheet 200. The reflected second light L2 and the third light L3 reflect from a reflecting sheet (not shown) that is positioned under the prism sheet 200 so that the second lights L2 and the third lights L3 are recycled, which increases luminance of the LCD device.

Figure 3:
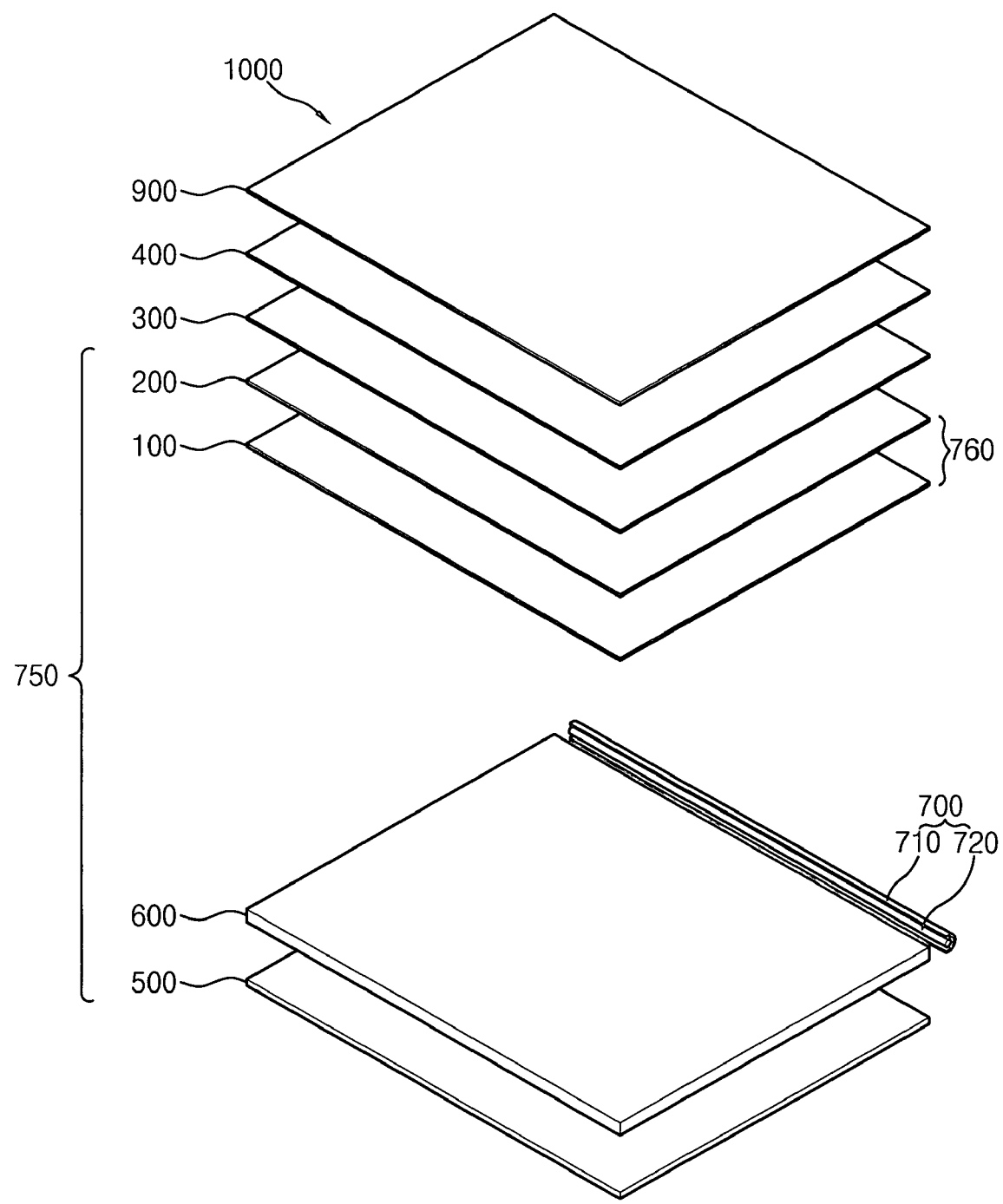
FIG. 3 is an exploded perspective view showing an LCD device having the prism sheet shown in FIG. 2.

FIG. 3 is an exploded perspective view showing an LCD device having the prism sheet shown in FIG. 2.

Referring to FIG. 3, the LCD device 1000 includes a backlight assembly 750, an LCD panel 900 and a fixing member (not shown). The backlight assembly 750 includes a lamp assembly 700, a prism sheet 200, and a receiving container (not shown).

The lamp assembly 700 is provided on the backlight assembly 750. A reflective polarizing film 300 and a polarizing film 400 are provided in the backlight assembly 750.

The lamp assembly 700 includes at least one lamp 720 that generates a light and a reflection cover 710. The light generated from the lamp 720 reflects from an inner surface of the reflection cover 710 toward the light guiding plate 600. The backlight assembly 750 further includes a reflecting sheet 500. The light leaked from the light guiding plate 600 is reflected from the reflecting sheet 500 provided adjacent to the light guiding plate 600. The lamp assembly 700 is received in the receiving container (not shown) that is adjacent to a side of the receiving container (not shown).

The lamp 720 may include a cold cathode fluorescent lamp (CCFL) having an extended cylindrical shape, from among a variety of shapes. According to the embodiment shown in FIG. 3, the reflecting sheet 500 may include polyethylene terephthalate (PET). Alternatively, the reflecting sheet 500 may include a metal chassis and a reflecting layer coated or applied on the metal chassis. The light generated from the lamp 720 reflects from the reflecting sheet 500 toward the light guiding plate 600.

The light guiding plate 600 includes multiple surfaces, such as a light incident surface, a lower surface and an upper surface. The light generated from the lamp assembly 700 is incident upon the light guiding plate 600 through the light incident surface. The lower surface of the light guiding plate 600 may be connected with at least one side of the light incident surface. The lower surface corresponds with the upper surface.

The receiving container (not shown) includes a bottom plate and a plurality of sidewalls protruded from the perimeter of the bottom plate. The receiving container (not shown) receives the lamp assembly 700 and the light guiding plate 600.

The backlight assembly 750 further includes the reflecting sheet 500 and at least one optical sheet 760. The reflecting sheet 500 is positioned under the light guiding plate 600. The at least one optical sheet 760 is provided on the light guiding plate 600. The at least one optical sheet 760 may include the prism sheet 200 and at least one diffusion sheet 100.

The light leaking from the lower surface of the light guiding plate 600 reflects from the reflecting sheet 500 toward the light guiding plate 600. For example, the reflecting sheet 500 includes polyethylene terephthalate (PET), polycarbonate (PC), etc.

The optical sheets 760 improve optical characteristics of the light that exits from the light guiding plate 600. The diffusion sheet 100 diffuses the light that exits from the light guiding plate 600 to make substantially uniform the luminance of light. It is understood that the optical sheets 760 may alternatively include an additional diffusion sheet, an additional prism sheet, etc.

The backlight assembly 750 may further include a back cover (not shown) to dissipate heat generated from the lamp assembly 700. The back cover (not shown) may be combined with the receiving container (not shown). For example, the back cover (not shown) contacts a lower surface of the reflecting sheet 500, which is partially exposed through an opening of the receiving container (not shown). The back cover also prevents or substantially reduces drifting of the lamp assembly 700. The back cover may include a metal having high thermal conductivity.

The fixing member (not shown) may be provided on the LCD panel 900 to fix or attach the LCD panel 900 with the backlight assembly 750.

Figure 4:
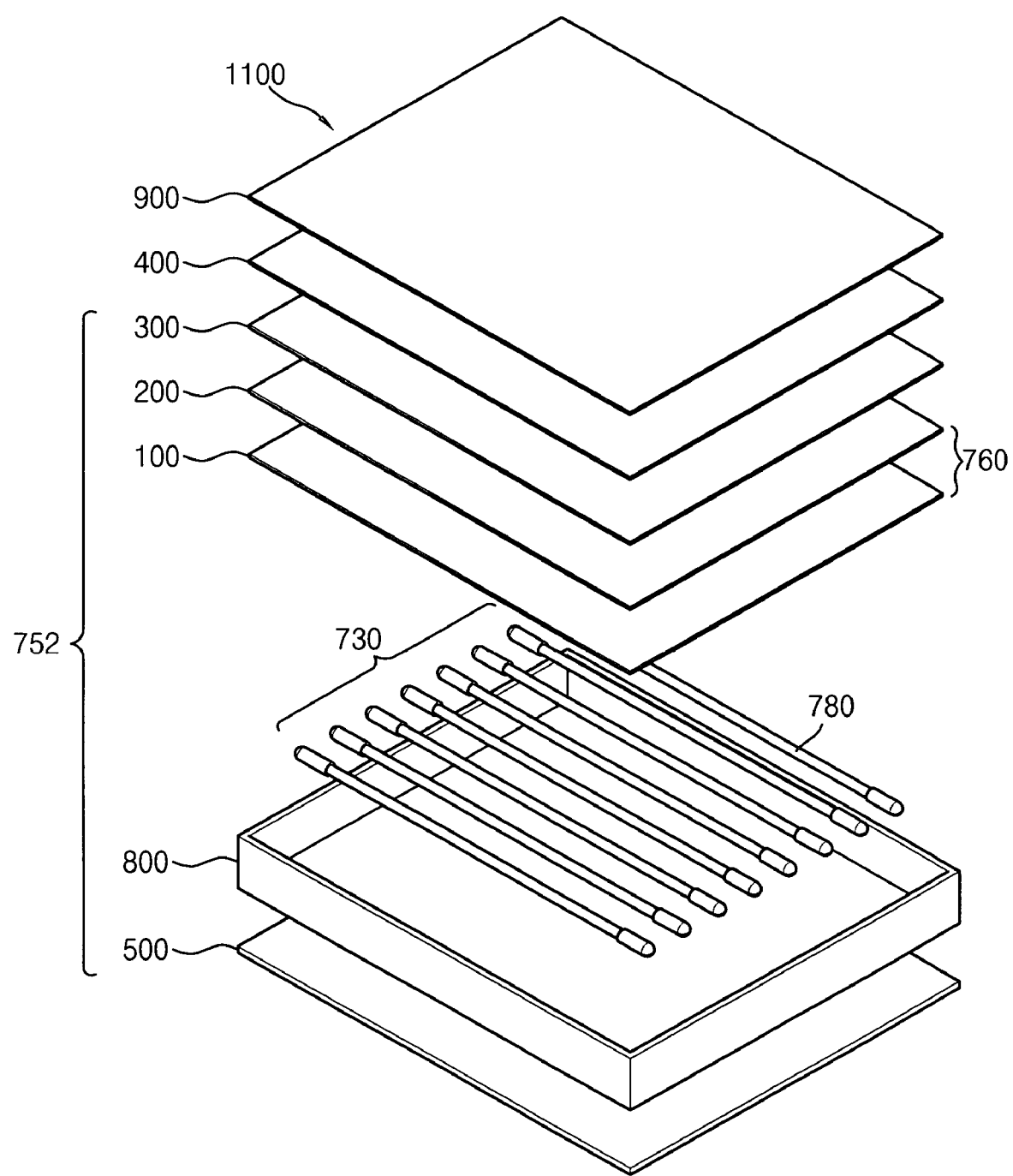
FIG. 4 is an exploded perspective view showing an LCD device according to an embodiment of the invention.

FIG. 4 is an exploded perspective view showing an LCD device according to another embodiment of the invention. The LCD device of FIG. 4 is same as in FIG. 3, except for the backlight assembly. The same reference numerals refer to the same or similar parts as those described in Embodiment 3 and any further explanation concerning the above elements will be omitted as necessary.

Referring to FIG. 4, the LCD device 1100 includes a backlight assembly 752, an LCD panel 900, and a fixing member (not shown). The backlight assembly 752 includes a lamp assembly 730, a prism sheet 200, and a receiving container (not shown).

The lamp assembly 730 includes a lamp or a plurality of lamps 780 that are in substantially parallel with one another. Each lamp 780 generates light. For example, in the embodiment discussed above and shown in FIG. 4, each of the lamp or lamps 780 include a cold cathode fluorescent lamp (CCFL).

The CCFL may have an extended cylindrical shape. The light generated from the CCFL is a white light that is substantially the same as sunlight. The CCFL has a longer life, lower heat generation, etc., than an incandescent lamp.

An arrangement of the lamps 780 changes according to a size of the LCD device 1100.

Referring again to FIG. 3, the LCD device 1000 that has an edge illumination type backlight assembly may be used with a small-screen LCD device. The edge illumination type backlight assembly may include at least one CCFL and the light guiding plate 600.

Referring again to FIG. 4, the LCD device 1100 that has a direct illumination type backlight assembly that may be used with a large-screen LCD device. The direct illumination type backlight assembly may have a plurality of the CCFLs arranged substantially parallel with one another.

Figure 5:
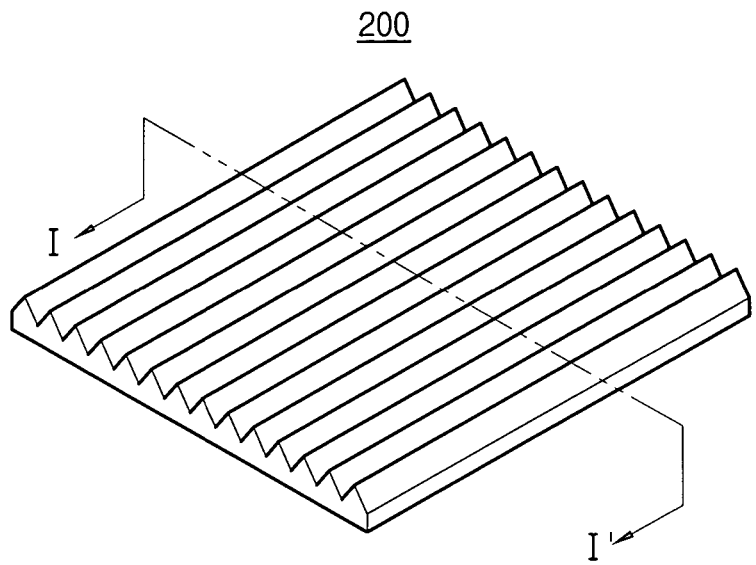
FIG. 5 is a perspective view showing a prism sheet shown in FIG. 2.
Figure 6:
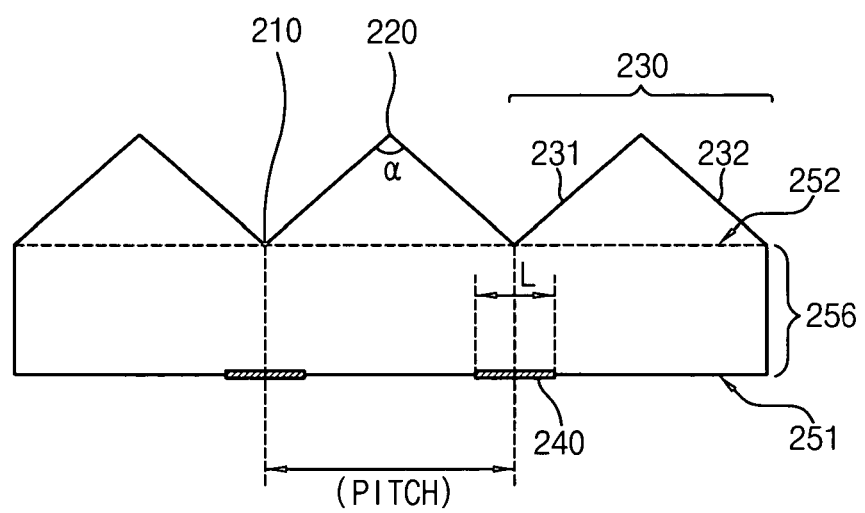
FIG. 6 is a cross-sectional view taken along a line I-I' shown in FIG. 5.

FIG. 5 is a perspective view showing a prism sheet shown in FIG. 2. FIG. 6 is a cross-sectional view taken along a line I-I' shown in FIG. 5.

Referring to FIG. 5 and FIG. 6, the prism sheet 200 includes a base film 256 and a prism pattern 230. The base film 256 includes a first surface 251 and a second surface 252 corresponding with the first surface 251. The prism pattern 230 may be provided on the second surface 252 of the prism sheet 200. The prism pattern 230 is referred to as a light path modulation member.

The prism pattern 230 may have a plurality of triangular-shaped prisms that are connected with each other substantially in parallel. The prisms may have a same or substantially the same size. Alternatively, the prisms may have different sizes and/or shapes. Each of the prisms of the prism pattern 230 include a first inclined surface 231 and a second inclined surface 232.

For example, triangular-shaped prisms include a first inclined surface 231 and a second inclined surface 232, which together form a ridge 220 and a groove 210. The first inclined surface 231 and the second inclined surface form an interior angle α at the ridge 220. The prism pattern 230 may be provided on the second surface 252 of the base film to guide the light toward a front of the prism sheet 200.

A distance between adjacent grooves 210 is referred to as a pitch. According to an embodiment of the invention, the pitch is between approximately 60 μm and 130 μm, and a width of the reflecting member 240 is less than or equal to two thirds of the pitch. In addition, the interior angle α is preferably between approximately 60° and 130°.

The reflecting member 240 may be provided between adjacent prisms under the groove 210. The reflecting member 240 may have a reflectivity of at least approximately 60%. For example, the reflecting member 240 may include titanium oxide ($TiO_2$), aluminum oxide ($Al_2O_3$), barium sulfate ($BaSO_4$), etc, or a mixture thereof.

Figure 7:
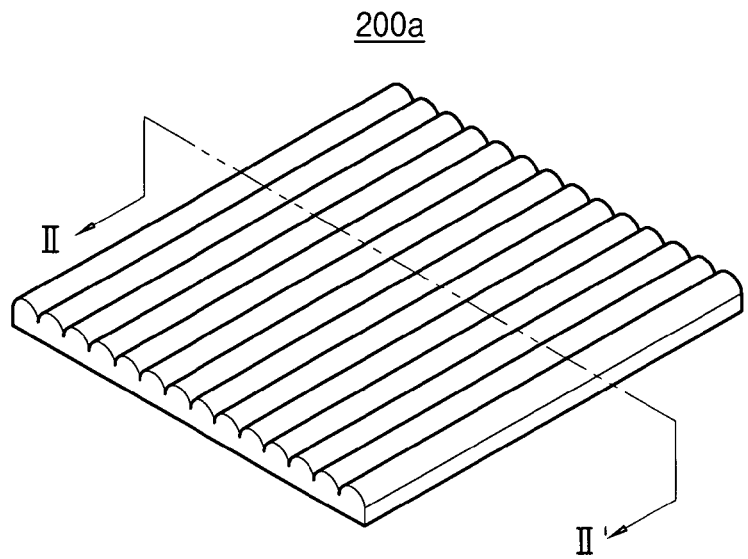
FIG. 7 is a perspective view showing a prism sheet according to an embodiment of the invention.
Figure 8:
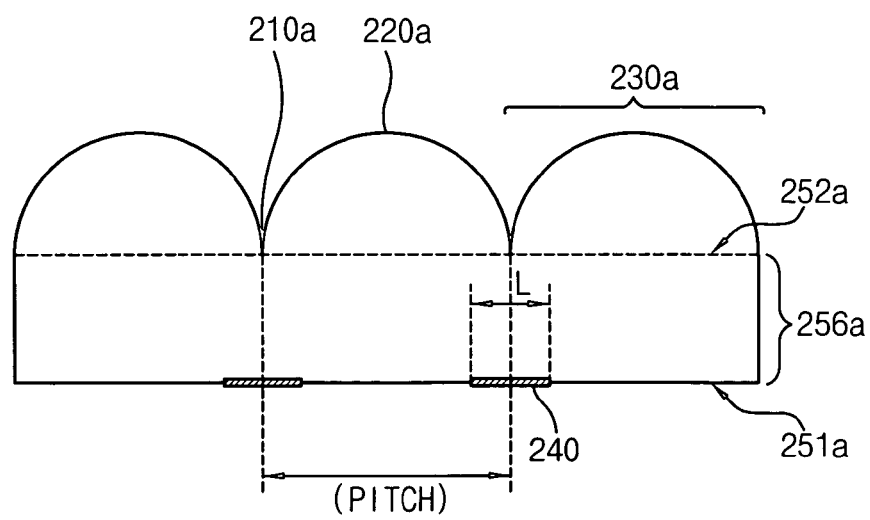
FIG. 8 is a cross-sectional view taken along a line II-II' shown in FIG. 7.

FIG. 7 is a perspective view showing a prism sheet according to another embodiment of the invention. FIG. 8 is a cross-sectional view taken along a line II-II' shown in FIG. 7.

Referring to FIG. 7 and FIG. 8, the prism sheet 200a includes a base film 256a and a prism pattern 230a. The base film 256a includes a first surface 251a and a second surface 252a corresponding with the first surface 251a. The prism pattern 230a may be provided on the second surface 252a of the prism sheet 200a. The prism pattern 230a is referred to as a light path modulation layer.

The prism pattern 230a may have a plurality of semicircular-shaped prisms that are connected to each other substantially in parallel. The semicircular-shaped prisms may have a same or substantially the same size. Alternatively, the semicircular-shaped prisms may have different sizes and/or shapes. The semicircular-shaped prisms together form a ridge 220a and a groove 210a. The prism pattern 230a may be provided on the second surface 252a to guide the light toward a front of the prism sheet 200a.

A distance between adjacent grooves 210a is referred to as a pitch. According to an embodiment of the invention, the pitch is between approximately 60 μm and 130 μm, and a width of the reflecting member 240 is equal to or less than approximately two thirds of the pitch.

The reflecting member 240 may be provided between adjacent prisms under the groove 210a. The reflecting member 240 has a reflectivity that is equal to or greater than approximately 60%. For example, the reflecting member 240 may include titanium oxide ($TiO_2$), aluminum oxide ($Al_2O_3$), barium sulfate ($BaSO_4$), etc., or a mixture thereof.

According to an embodiment of the invention, the prism sheet includes at least one reflecting member so that a portion of the light that is irradiated onto a lower surface of the prism sheet in a direction in which the light leaks is reflected from the reflecting member. The reflected light is recycled, which increases the luminance of the LCD device.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A prism sheet, comprising:
   a first surface upon which a light is incident;
   a second surface upon which the incident light exits, the second surface having a prism pattern; and
   a reflecting member provided on the first surface to partially reflect light that is irradiated onto the first surface, the reflecting member extended in a longitudinal direction of the prism pattern,
   wherein the prism pattern comprises a plurality of prisms, wherein adjacent prisms have a pitch of approximately 20μm to approximately 70μm,
   wherein the width of the reflecting member is less than or equal to two-thirds of the pitch of adjacent prisms of the prism pattern.

2. The prism sheet of claim 1, wherein the reflecting member is provided between adjacent prisms of the prism pattern.

3. The prism sheet of claim 1, wherein the reflecting member comprises at least one selected from the group consisting of titanium oxide ($TiO_2$), aluminum oxide ($Al_2O_3$), and barium sulfate ($BaSO_4$).

4. The prism sheet of claim 1, wherein the prism pattern comprises a plurality of triangular prisms that are positioned substantially parallel with each other.

5. The prism sheet of claim 4, wherein an interior angle of each of the triangular prisms is between approximately 60° and 130°.

6. The prism sheet of claim 1, wherein the prism pattern comprises a plurality of semicircular prisms that are positioned substantially parallel with each other.

7. A prism sheet comprising:
   a film comprising a first surface upon which a light is incident and a second surface through which the incident light exits;
   a light path modulation member provided on the second surface that guides the incident light toward a front of the prism sheet, the second surface having a prism pattern; and
   a reflecting member provided on the first surface to partially reflect light that is irradiated onto the first surface, the reflecting member being extended in a longitudinal direction of the prism sheet,
   wherein the prism pattern comprises a plurality of prisms, wherein adjacent prisms have a pitch of approximately 20μm to approximately 70μm.

wherein the width of the reflecting member is less than or equal to two-thirds of the pitch of adjacent prisms of the prism pattern.

8. The prism sheet of claim 7, wherein the light path modulation member is integral with the base film.

9. The prism sheet of claim 7, wherein the prisms are positioned adjacent to each other.

10. The prism sheet of claim 9, wherein the reflecting member is positioned between adjacent prisms.

11. The prism sheet of claim 9, wherein each of the prisms has a substantially triangular-shaped cross-section.

12. The prism sheet of claim 9, wherein each of the prisms has a substantially semicircular-shaped cross-section.

13. A backlight assembly comprising:
a light source that generates light; and
a prism sheet including:
a first surface upon which the generated light is incident;
a second surface upon which the incident light exits, the second surface comprising a prism pattern having a plurality of prisms; and
a reflecting member provided on the first surface to partially reflect light that is irradiated onto the first surface, the reflecting member being extended in a longitudinal direction of each of the prisms, wherein adjacent prisms form a pitch of approximately 20μm to approximately 70μm.
wherein the width of the reflecting member is less than or equal to two-thirds of the pitch.

14. The backlight assembly of claim 13, wherein the reflecting member is positioned between the adjacent prisms.

15. The backlight assembly of claim 13, wherein each of the prisms has a substantially triangular-shaped cross-section, and an interior angle of each of the prisms is approximately 60 degree. to approximately 130°.

16. The backlight assembly of claim 13, wherein each of the prisms has a substantially semicircular-shaped cross-section.

17. The backlight assembly of claim 13, further comprising:
a light guiding plate under the prism sheet and adjacent to the light source to guide the light generated from the light source toward the prism pattern.

18. The backlight assembly of claim 13, wherein the light source comprises a plurality of lamps arranged substantially parallel with each other under the prism pattern.

19. A liquid crystal display device, comprising:
a light source that generates a light;
a prism sheet comprising: a first surface upon which the light generated from the light source is incident;
a second surface including a prism pattern having a plurality of prisms, the incident light exiting through the second surface; and
a reflecting member provided on the first surface to partially reflect light that is irradiated onto the first surface, the reflecting member being extended in a longitudinal direction of each of the prisms; and
a liquid crystal display panel provided on the second surface of the prism sheet to display an image using the tight that passes through the prism sheet,
wherein adjacent prisms form a pitch of approximately 20μm to approximately 70μm.
wherein a width of the reflecting member is less than or equal to two-thirds of the pitch.

20. The liquid crystal display device of claim 19,
wherein the reflecting member is provided between the adjacent prisms.

21. The liquid crystal display device of claim 19, wherein each of the prisms has a substantially triangular-shaped cross-section, and an interior angle of each of the prisms is approximately 60° to approximately 130°.

22. The liquid crystal display device of claim 19, wherein each of the prisms has a substantially semicircular-shaped cross-section.

23. The liquid crystal display device of claim 19, further comprising: a light guiding plate under the prism sheet and adjacent to the light source to guide the light generated from the light source toward the prism pattern.

24. The liquid crystal display device of claim 19, wherein the light source comprises a plurality of lamps arranged substantially parallel with each other under the prism pattern.

* * * * *